(12) United States Patent
Andreis et al.

(10) Patent No.: US 12,290,203 B2
(45) Date of Patent: May 6, 2025

(54) PRESSURE PROFILING DEVICE, PARTICULARLY FOR DISPENSING UNITS OF PRESSURIZED LIQUIDS

(71) Applicant: DOLPHIN FLUIDICS S.R.L., Corsico (IT)

(72) Inventors: Diego Andreis, Milan (IT); Francesco Butera, Arese (IT); Filippo Lucetti, Carrara (IT)

(73) Assignee: DOLPHIN FLUIDICS S.R.L., Corsico (IT)

( * ) Notice: Subject to any disclaimer, the term of this patent is extended or adjusted under 35 U.S.C. 154(b) by 768 days.

(21) Appl. No.: 17/510,480

(22) Filed: Oct. 26, 2021

(65) Prior Publication Data

US 2022/0160165 A1    May 26, 2022

(30) Foreign Application Priority Data

Nov. 26, 2020 (IT) ........................ 102020000028625

(51) Int. Cl.
*A47J 31/52* (2006.01)
*A47J 31/46* (2006.01)

(52) U.S. Cl.
CPC ......... *A47J 31/5255* (2018.08); *A47J 31/461* (2018.08); *A47J 31/468* (2018.08); *A47J 31/469* (2018.08); *A47J 31/5251* (2018.08)

(58) Field of Classification Search
CPC ........ A47J 31/36; A47J 31/461; A47J 31/468; A47J 31/469; A47J 31/5251; A47J 31/5255

(Continued)

(56) References Cited

U.S. PATENT DOCUMENTS 6,142,063 A    11/2000  Beaulieu et al.
2021/0315409 A1*  10/2021  Jianming .............. A47J 31/469

FOREIGN PATENT DOCUMENTS

EP          1589336 A1 * 10/2005   .......... F04B 11/0075
WO    WO-2007046702 A2    4/2007

(Continued)

OTHER PUBLICATIONS

Search Report issued Jul. 20, 2021 in Italian Patent Application No. IT202000028625 (with English translation of categories), 3 pages.

*Primary Examiner* — Dana Ross
*Assistant Examiner* — James F Sims, III
(74) *Attorney, Agent, or Firm* — Element IP, PLC

(57) ABSTRACT

The present invention relates to a pressure profiling device (1), particularly for dispensing units of pressurized liquids, comprising a pump (3) adapted to generate a flow of a pressurized liquid in outlet, said pump (3) being configured to be connected, by means of at least one delivery duct (5, 5'), to at least one dispensing unit (7, 7') of said liquid, a three-way hydraulic fitting (9, 9') being applied to said at least one delivery duct (5, 5'), configured to divert a first part of said liquid leaving said pump (3) into a bypass duct (11, 11'), a remaining second part of said liquid continuing on said at least one delivery duct (5, 5'), a proportional valve (13, 13') being applied to said bypass duct (11, 11'), which can be operated to vary the flow rate of said first part of said liquid diverted in said bypass duct (11, 11') as a function of the degree of opening of said proportional valve (13, 13') so as to vary the pressure of the remaining second part of said liquid, According to the invention, a restriction (15, 15') is applied to said at least one delivery duct (5, 5') between said pump (Continued)

(3) and said three-way hydraulic fitting (9, 9'), configured to impose a reduction in the flow rate of said liquid leaving said pump (3).

10 Claims, 3 Drawing Sheets

(58) Field of Classification Search
USPC .......................................................... 99/280
See application file for complete search history.

(56) References Cited

FOREIGN PATENT DOCUMENTS

| WO | WO-2007046702 A3 | 4/2007 |
|----|------------------|--------|
| WO | WO-2017155401 A1 | 9/2017 |
| WO | WO-2019077567 A1 | 4/2019 |

* cited by examiner

PRESSURE PROFILING DEVICE, PARTICULARLY FOR DISPENSING UNITS OF PRESSURIZED LIQUIDS

The present invention relates to a pressure profiling device, particularly for dispensing units of pressurized liquids, and in particular to a pressure profiling device for an espresso coffee machine.

As is well known, there are currently many hydraulic circuits for the dispensing of pressurized liquids in which it is desirable to be able to regulate and vary the pressure of the liquid in outlet.

For example, in the case of espresso coffee machines, it is important to be able to adjust and vary the water pressure that operates the extraction of coffee from the dose of coffee powder.

In particular, in espresso coffee machines, the drink is obtained by forcing hot water under pressure, typically in the order of 9 bar or even 12 bar, through a dose of ground coffee powder. However, the dynamic cycle for dispensing the beverage must be preceded by an initial static phase, since, before water begins to flow through the coffee powder, the ideal condition requires that the whole layer of powder must be homogeneously wet to prevent the formation of "preferential paths" for the water itself. In the extraction process of the espresso coffee, this phase is commonly referred to as brewing, as the powder is macerated in water without a significant flow of the water itself. In order to carry out the brewing phase correctly, the hot water must reach the coffee powder without turbulence and with a gradual increase in the pressure front. Only in a second step, after an interval of not less than 5 seconds, the hot water dispensing step begins at higher pressures.

Also thanks to the increasing spread of new types of powdered coffee blends, once the brewing step has finished, the need is increasingly felt to be able to vary the pressure of the hot water reaching and passing through the dose of powdered coffee (so-called "pressure profiling"), to obtain espresso coffee with desired organoleptic properties, so as to be able to adapt the coffee dispensing parameters to the requirements of the particular types of existing coffee blends.

One of the known methods of pressure profiling in espresso coffee machine dispensing units involves diverting, from the pump delivery duct in these machines, part of the liquid flow rate exiting the pump to a discharge, or recirculation, duct fitted with a proportional valve. In fact, depending on the degree of opening of the proportional valve, it is possible to vary the pressure of the liquid that continues its path on the delivery duct to reach the dispensing unit.

However, machines using this system for liquid pressure profiling are not free from drawbacks, including the fact that pressure profiling is not sufficiently accurate or stable.

The main task of the present invention is to realize a pressure profiling device, particularly for dispensing units of pressurized liquids, which obviates the drawbacks of the prior art by allowing accurate and stable pressure variation and adjustment.

Within the scope of this task, an object of the present invention is that of realizing a pressure profiling device that is capable of providing the broadest guarantees of reliability and safety when used.

Another object of the invention consists of realizing a pressure profiling device which is easy to manufacture and economically competitive when compared to the prior art.

The above-mentioned task, as well as the aforementioned purposes and others which will better appear later, are achieved by a pressure profiling device, particularly for dispensing units of pressurized liquids, as claimed in claim 1.

Other features are provided in the dependent claims.

Further characteristics and advantages will become apparent from the description of a preferred but not exclusive embodiment of a pressure profiling device, particularly for dispensing units of pressurized liquids, illustrated only by way of non-limitative example with the aid of the accompanying drawings, in which.

Figure 1:
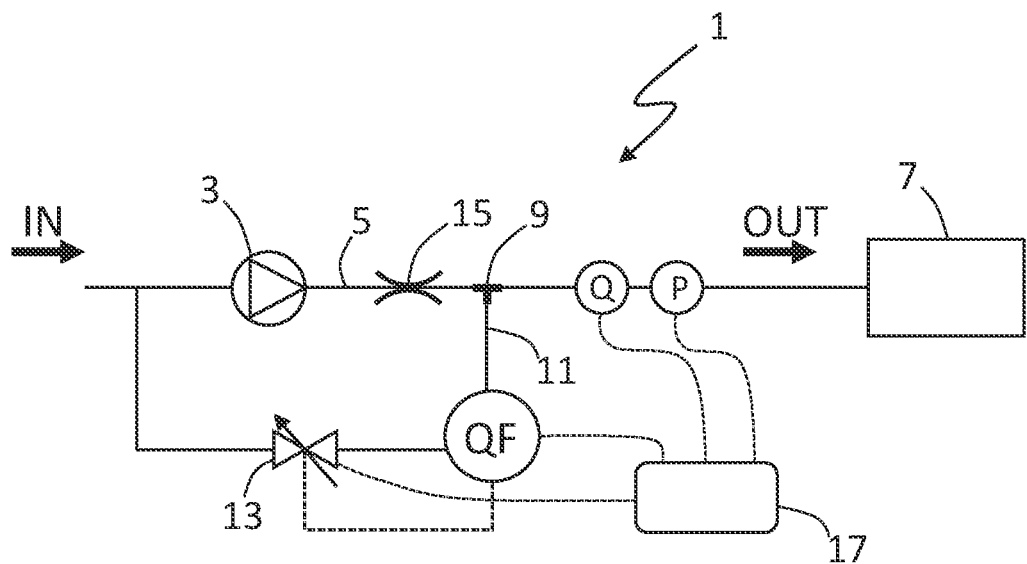
FIG. 1 is a schematic representation of the hydraulic circuit of a pressure profiling device, according to the invention.

With reference to the above-mentioned figures, the pressure profiling device, indicated in its entirety by reference numeral 1, comprises a pump 3 adapted to generate a flow of a pressurized liquid in outlet. The pump 3 is configured to be connected, by means of at least one delivery duct 5, 5', to at least one dispensing unit 7, 7' of the liquid. A three-way hydraulic fitting 9, 9' is applied to such delivery duct 5, 5', configured to divert a first part of the liquid leaving the pump 3 into a bypass duct 11, 11', while a remaining second part of the liquid continues on the delivery duct 5, 5'. A proportional valve 13, 13' is applied to the bypass duct 11, 11', which can be operated to vary the flow rate of the first part of liquid diverted in the bypass duct 11, 11' as a function of the degree of opening of the proportional valve 13, 13' itself, so as to vary the pressure of the remaining second part of liquid, which then reaches the dispensing unit 7, 7'.

According to the invention, a restriction 15, 15' is applied to the delivery duct 5, 5' between the pump 3 and the three-way hydraulic fitting 9, 9', configured to impose a reduction in the flow rate of the liquid leaving the pump 3.

Advantageously, this restriction 15, 15' has the function of equalizing the pressure and flow rate values of the liquid upstream of the proportional valve 13, 13', as the operation of the proportional valve 13, 13' itself varies.

Furthermore, the fact of providing for a limitation of the flow rate at the outlet of the pump 3 makes it possible to select a proportional valve 13, 13' operating in more limited working intervals, and consequently to use a more accurate proportional valve 13, 13'.

In a practical example, the restriction 15, 15' limits the operating flow rate of liquid which the pump 3 is capable of producing to a maximum flow rate compatible with the requirements of the dispensing unit 7, 7', so that the proportional valve 13, 13' is operative to vary the pressure of the liquid present in the delivery duct 5, 5' only in relation to the flow rate of the liquid present in the delivery duct 5, 5' downstream of the restriction 15, 15'.

In this way, the proportional valve 13, 13' can be selected to operate exactly in the range of liquid flow rate values compatible with the specifications of the dispensing unit 7, 7'. In substance, it is possible in this way to select a proportional 13, 13' valve whose dynamics can be fully exploited.

Figure 2:
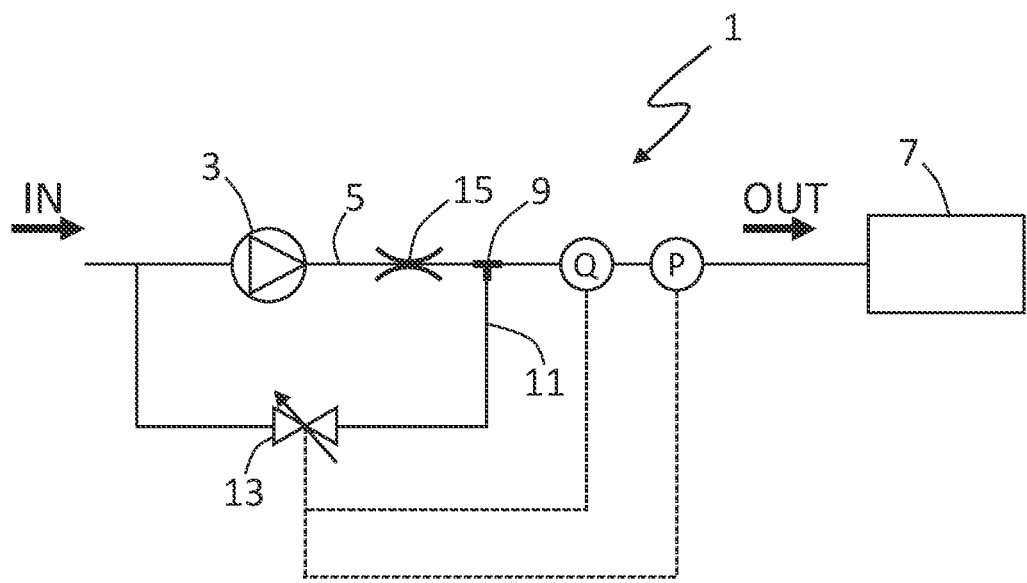
FIG. 2 is a schematic representation of the hydraulic circuit of a variant of the pressure profiling device shown in FIG. 1, according to the invention.
Figure 3:
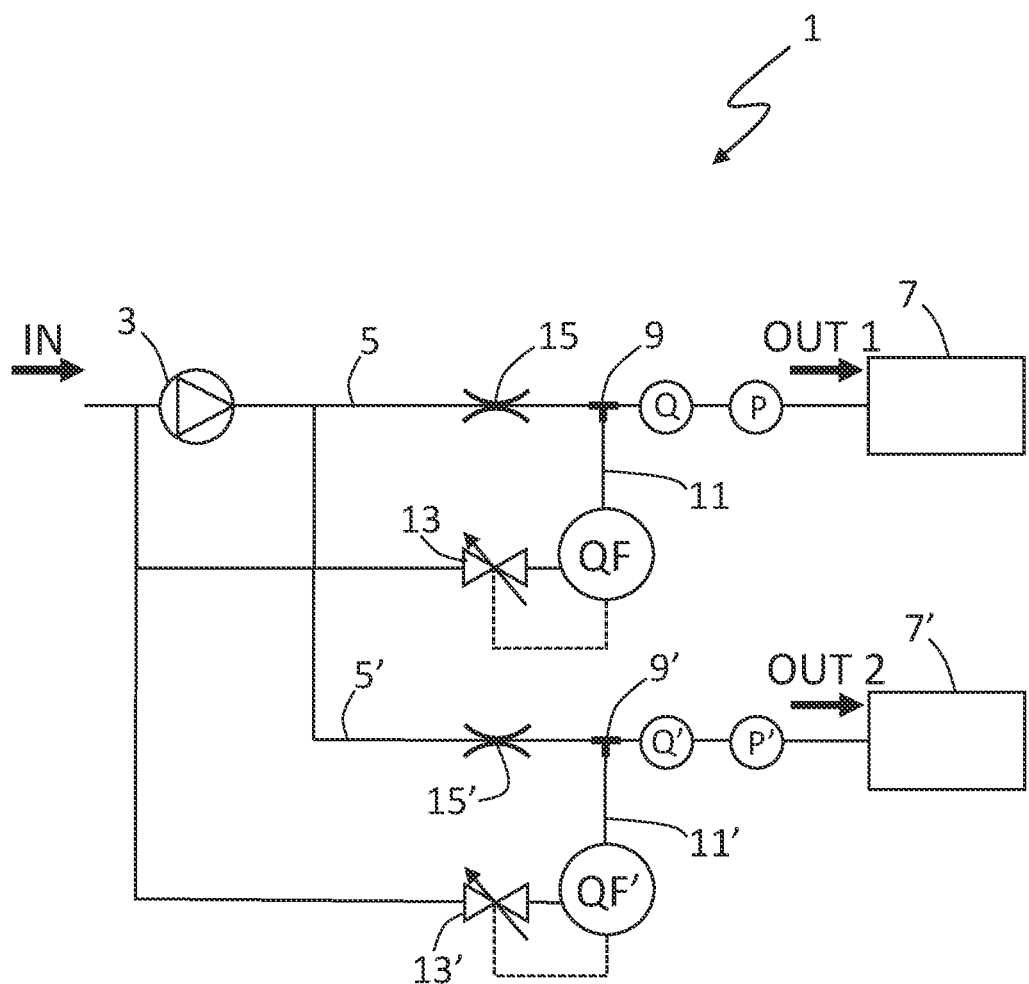
FIG. 3 is a schematic representation of the hydraulic circuit of a further variant of the pressure profiling device illustrated in FIG. 1, according to the invention, applied to a plurality of dispensing units of pressurized liquids.

Moreover, considering that downstream of the proportional valve 13, 13' the liquid present in the bypass duct 11, 11' can recirculate on the pump 3, as shown in the diagrams of FIGS. 1, 2 and 3, or be discharged for disposal, the presence of the restriction 15, 15' makes it possible, in the case of large opening degrees of the proportional valve 13, 13', to limit the quantity of liquid that would be recirculated on the pump 3 or discharged. In substance, in the absence of the restriction 15, 15', and in the case of large opening degrees of the proportional valve 13, 13', all the liquid flow generated by pump 3 would be recirculated on the pump 3 itself, or discharged, with a consequent evident waste of energy and liquid.

Advantageously, the restriction 15, 15' is configured to impose a fixed and predefined flow rate reduction on the liquid leaving the pump 3.

Advantageously, as illustrated in particular in FIG. 3, the pump 3 is configured to be connected, by means of a plurality of delivery ducts 5, 5', to a corresponding plurality of dispensing units 7, 7'. A three-way hydraulic fitting 9, 9' is applied to each of the delivery ducts 5, 5', configured to divert a first part of the liquid leaving the pump 3 in a corresponding bypass duct 11, 11'. A proportional valve 13, 13' is applied to each of the bypass ducts 11, 11'. The aforesaid restriction 15, 15' is applied to each delivery duct 5, 5' between the pump 3 and the three-way hydraulic fitting 9, 9'.

An example of a pressurized liquid dispensing system comprising several dispensing units 7, 7' is that of espresso coffee machines comprising two or more different dispensing units in order to be able to prepare a plurality of coffees at the same time.

In this case there is a single pump 3 which serves all the dispensing units 7, 7' present.

The liquid pressure profiling in this case takes place independently for the different dispensing units 7, 7' thanks to the presence of a bypass duct 11, 11' and a proportional valve 13, 13' for each dispensing unit 7, 7'.

In this case, the presence of a restriction 15, 15' on each of the delivery ducts 5, 5' branching off from the pump 3 makes it possible to distribute in a stable and balanced manner the flow of liquid generated by the pump 3 to the various dispensing units 7, 7' and to maintain the capacity of the pump 3 so as not to limit the flow rates in the event of simultaneous dispensing by the various dispensing units 7, 7'.

The restrictions 15, 15' prevent, for example, that if only one proportional valve 13, 13' is open, all the flow generated by pump 3 recirculates on pump 3 itself, or is discharged, through the bypass duct 11, 11' where the proportional valve 13, 13' is open. In this way, the total flow rate of the pump 3 is distributed between the multiple delivery ducts 5, 5' in a substantially equal manner.

Also in this case, the presence of the restrictions 15, 15' makes it possible to select proportional valves 13, 13' whose operating dynamics can be fully exploited.

Advantageously, the restriction 15, 15' comprises an orifice, or gigler, the cross-sectional area of which is selected according to the maximum flow rate of the liquid intended to reach the dispensing unit 7, 7'.

Advantageously, in the case of a plurality of dispensing units 7, 7' the pump 3 is chosen in such a way as to be able to guarantee the dispensing of pressurized liquid by all the dispensing units 7, 7' and at the same time the restriction 15, 15' is sized to guarantee that downstream thereof, i.e. in the part of the delivery duct 5, 5' which reaches the dispensing unit 7, 7' and/or in the bypass duct 11, the liquid flow rate is at most equal to the maximum liquid flow rate required by the dispensing unit 7, 7'.

For example, in the case of an espresso coffee machine, the restriction 15, 15' may include an orifice of circular cross-section of a diameter less than or equal to 3 mm, and preferably of a diameter comprised between 0.7 mm and 1.2 mm.

Advantageously, the pressure profiling device 1 comprises a flow sensor QF, QF' placed on the bypass duct 11, 11'. The flow sensor QF, QF' is designed to generate a signal indicative of the flow rate of the part of the liquid flowing in the bypass duct 11, 11', i.e. the first part of liquid. The pressure profiling device 1 further comprises an electronic control unit programmed to vary the degree of opening of the proportional valve 13, 13' on the basis of the signal indicative of the flow rate of the part of liquid flowing in the bypass duct 11, 11'.

In this way, knowing moment by moment the flow rate of liquid passing through the bypass duct 11, 11', the operation of the proportional valve 13, 13' can be controlled with extreme precision in real time.

Advantageously, the pressure profiling device 1 comprises a pressure sensor P, P' placed on the delivery duct 5, 5' downstream of the three-way hydraulic fitting 9, 9' and adapted to generate a signal indicative of the pressure of the part of liquid which continues towards the dispensing unit 7, 7'. The pressure profiling device 1 further advantageously comprises, as mentioned, an electronic control unit 17 programmed to vary the degree of opening of the proportional valve 13, 13' on the basis of the signal indicative of the pressure of the part of liquid flowing towards the dispensing unit 7, 7', i.e. of the remaining second part of liquid.

In this way it is possible to control the operation of the proportional valve 13, 13' directly on the basis of the pressure value of the liquid reaching the dispensing unit 7, 7'.

Advantageously, both the flow sensor QF, QF', and the pressure sensor P, P' can be present. In this case, the electronic control unit 17 can be programmed to vary the degree of opening of the proportional valve 13, 13' from the processing of both signals generated by the flow sensors QF, QF' and the pressure sensors P, P'. Alternatively, the pressure signal generated by the pressure sensor P, P' can be used also just to make the current pressure value of the liquid available to a user on a display panel.

Advantageously, the pressure profiling device 1 comprises a further pressure sensor Q, Q' placed on the delivery duct 5, 5' downstream of the three-way hydraulic fitting 9, 9' and adapted to generate a signal indicative of the flow rate of the part of liquid flowing towards the dispensing unit 7, 7'. The pressure profiling device 1 further advantageously comprises, as mentioned, an electronic control unit 17 programmed to vary the degree of opening of the proportional valve 13, 13' on the basis of the signal indicative of the flow rate of the part of liquid flowing towards the dispensing unit 7, 7'.

In this way it is possible to control the operation of the proportional valve 13, 13' directly on the basis of the flow rate value of the liquid reaching the dispensing unit 7, 7'.

Also in this there may be two or more sensors between the flow sensor QF, QF', the pressure sensor P, P' and the further flow sensor Q, Q', the signals of which may be used by the electronic control unit 17 to control the operation of the proportional valve 13, 13'.

The flow rate and/or pressure signals generated by the flow sensor Q, Q' and/or by the pressure sensor P, P' can also only be used by the electronic control unit 17 to make the current flow rate and/or pressure value of the liquid available to a user on a display panel.

Advantageously, in the case of several dispensing units 7, 7' there are pressure sensors P, P' and/or flow sensors Q, Q' at each dispensing unit 7, 7'.

Figure 4:
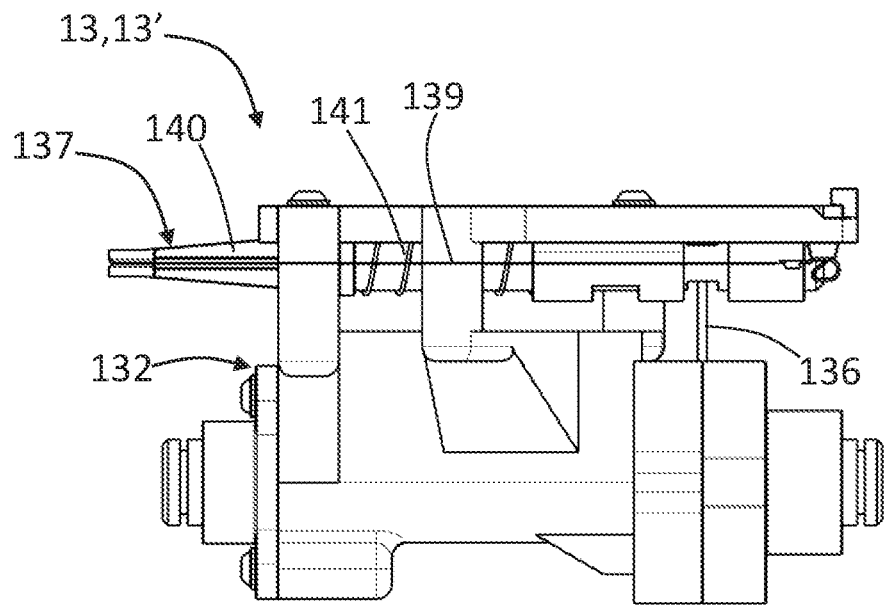
FIG. 4 is a side elevation view of a component of the pressure profiling device, according to the invention, and in particular of a proportional valve.
Figure 5:
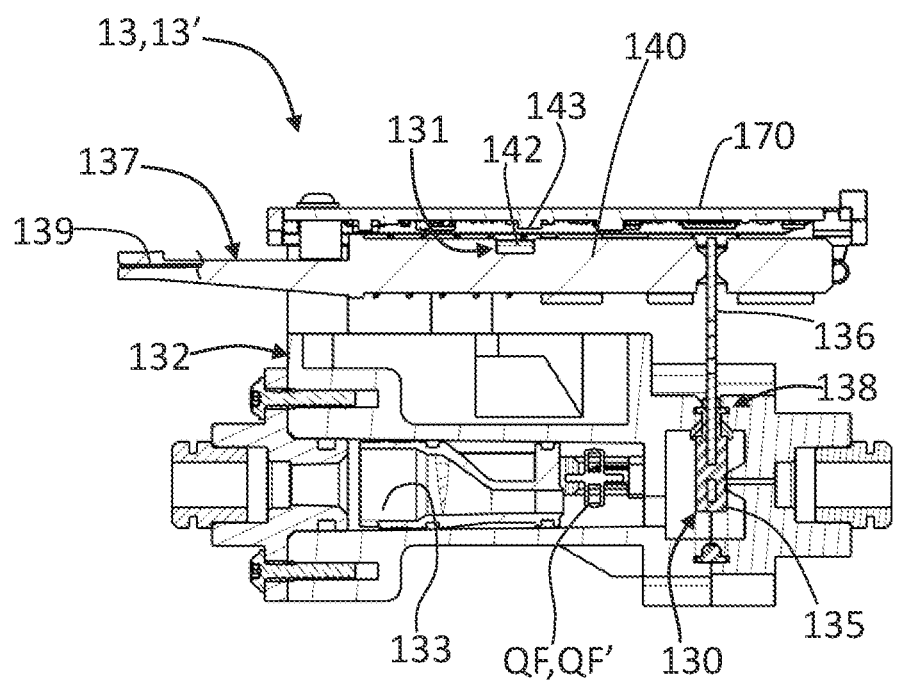
FIG. 5 is a side section view of the component of FIG. 4.

Advantageously, as illustrated in FIGS. 4 and 5, the proportional valve 13, 13' incorporates the flow sensor QF, QF'.

Advantageously, the proportional valve 13, 13' includes a shutter 130 movable between a closed position and a maximum opening position, and a position sensor 131 adapted to generate a signal indicative of the position of the shutter 130 between the closed position and the maximum opening position. The electronic control unit 17 is programmed to vary the position of the shutter 130 based on the signal indicative of the position of the shutter 130 between the closed position and the maximum opening position.

In this way it is possible to control with extreme precision the degree of opening of the proportional valve 13, 13', as the control of the opening of the proportional valve 13, 13' can be carried out knowing, instant by instant, both the degree of opening of the shutter 130, by means of the position sensor 131, and the flow rate of the liquid that is flowing through the proportional valve 13, 13', by means of the flow sensor QF, QF'.

Advantageously, the position sensor 131 is a magnetic linear position sensor.

As illustrated in FIGS. 4 and 5, the proportional valve 13, 13' comprises a rigid body 132 within which a channel 133 is formed which forms part of the bypass duct 11, 11'.

The shutter 130 includes a movable fluid sealing element 135 for intercepting fluid flowing in the channel 133, between the inlet and the outlet thereof, and a lever element 136 associated at a first end with the movable fluid sealing element 135 and at a second end with an actuator device 137. In particular, the lever element 136 is hinged about the rigid body 132 of the valve 13, 13' at a fulcrum point 138 arranged in an intermediate zone between the first end and the second end of the lever element 136.

The actuator device 137 is configured to move the lever element 136 of the shutter element 130 about the fulcrum point 138 so as to move the movable fluid sealing element 135 accordingly between a closed position and a maximum opening position.

In practice, the tilting movement of the lever element 136 about the fulcrum point 138 progressively moves the fluid sealing element 135 to open and close the channel 133.

The actuator device 137 comprises an actuator element 139 made of a shape memory material (so-called SMA— Shape Memory Alloy) which can be operated progressively to move the lever element 136 of the shutter element 130 about the fulcrum point 138 so as to proportionally vary the degree of opening of the movable fluid sealing element 135 between the opening position and the closing position, and vice versa.

The actuator device 137 further comprises a movable piston 140 associated with the actuator element 139 and the lever element 136 of the shutter element 9, respectively. The actuator device 137 further comprises an elastic contrasting element 141 for exerting a thrust on said piston 140, adapted to counteract the action of the actuator element 139.

Advantageously, the position sensor 131 comprises a movable element 142 rigidly associated with the movable piston 140, and a fixed element 143 rigidly associated with the rigid body 132. The position sensor 131 is adapted to generate a signal indicative of relative displacement between the movable element 142 and the fixed element 143, wherein such signal is related to the degree of opening of the shutter element 130.

Advantageously, the fixed element 143 of the position sensor 131 may be incorporated in an electronic board 170 rigidly associated with the rigid body 132 of the proportional valve 13, 13', wherein the electronic board 170 comprises a processor programmed to control the actuation of the actuator element 139, based on the signal generated by the position sensor 131 and/or based on the signal generated by the flow sensor QF, QF' incorporated into the proportional valve 13, 13' itself.

Each proportional valve 13, 13' in the pressure profiling device 1 may comprise its own electronic board 170.

Advantageously, the electronic control unit 17 also comprises the processor for controlling the actuation of the actuator element 139 of each proportional valve 13, 13'.

The present invention also relates to an espresso coffee machine comprising at least one dispensing unit 7, 7' of espresso coffee and a pressure profiling device 1 connected to said at least one dispensing unit 7, 7' by means of at least one delivery duct 5, 5'.

Advantageously, the espresso coffee machine comprises a plurality of espresso coffee dispensing units 7, 7'.

The operation of the pressure profiling device is clear and evident from what is described.

With particular reference to the application to espresso coffee machines provided with a plurality of dispensing units, the pressure of the water that is sent to a dose of powdered coffee can be varied in real time, by appropriately activating, by means of the electronic control unit 17, the proportional valve 13, 13' associated with the dispensing unit 7, 7' that is at that moment appointed to prepare the drink. In the meantime, the user can also view the pressure and flow rate values of the water, in order to be able to intervene, if necessary, in real time to vary the water pressure and thus carry out so-called "pressure profiling".

In practice, it was found that the pressure profiling device, particularly for dispensing units of pressurized liquids, according to the present invention, fulfils the task as well as the intended purpose as it enables the pressure of the liquid to be adjusted accurately and stably.

Another advantage of the pressure profiling device, according to the invention, is that the presence of the restriction allows the dispensing of the pressurized liquid to be managed optimally, particularly in the case of a plurality of dispensing units.

A further advantage of the pressure profiling device, according to the invention, is that the operation of the proportional valve can be controlled in real time and very precisely, based on the flow rates and pressures of the liquid itself.

A further advantage of the pressure profiling device, according to the invention, is that the proportional valve incorporates directly into its interior the flow sensor that can be used to control its operation and thus to adjust the pressure profiling.

The pressure profiling device, particularly for dispensing units of pressurized liquids, as conceived herein, is subject to numerous modifications and variants, all falling within the scope of the inventive concept.

Furthermore, all the details can be replaced by other technically equivalent elements.

In practice, any materials can be used according to requirements, as long as they are compatible with the specific use, the dimensions and the contingent shapes.

The invention claimed is:

1. A pressure profiling device, comprising:
   a pump,
   a delivery duct, and
   a bypass duct,
   wherein:
   the pump is adapted to generate a flow of a pressurized liquid at an outlet side of the pump;
   the outlet side of the pump is connected to the delivery duct;
   the delivery duct comprises a three-way hydraulic fitting and a restriction, where the restriction is arranged between the outlet side of the pump and the three-way hydraulic fitting, and the restriction is configured to impose a reduction in flow rate of liquid leaving the pump;
   the delivery duct is configured, downstream of a first outlet of the three-way hydraulic fitting, to connect to at least one dispensing unit of said liquid;
   a first end of the bypass duct is connected to a second outlet of the three-way hydraulic fitting, and a second end of the bypass duct is connected to an inlet side of the pump;
   the three-way hydraulic fitting is configured to divert a first part of said liquid leaving said pump into the bypass duct, while a remaining second part of said liquid continues on said delivery duct; and
   the bypass duct comprises a proportional valve, wherein said proportional valve is configured to vary the flow rate of said first part of said liquid diverted in said bypass duct as a function of the degree of opening of said proportional valve so as to vary the pressure of the remaining second part of said liquid.

2. The pressure profiling device according to claim 1, wherein:
   said delivery duct is a plurality of delivery ducts and said pump is connected to the plurality of delivery ducts;
   said three-way hydraulic fitting is a plurality of three-way hydraulic fittings and said restriction is a plurality of restrictions,
   each of the delivery ducts comprises one of the three-way hydraulic fittings and one of the restrictions, where the restriction is arranged between the outlet side of the pump and the respective three-way hydraulic fitting;
   each of the delivery ducts is configured, downstream of the first outlet of the respective three-way hydraulic fitting, to connect to a corresponding dispensing unit of said liquid;
   said bypass duct is a plurality of bypass ducts and each one of the plurality of the bypass ducts is connected, at a first end, to the second outlet of one of the three-way hydraulic fittings, and is connected, at a second end, to an inlet side of the pump; and
   each of the three-way hydraulic fittings is configured to divert said first part of said liquid leaving said pump into a corresponding bypass duct.

3. The pressure profiling device according to claim 1, wherein said restriction comprises an orifice whose section area is selected based on the maximum flow rate of said liquid intended for reaching said at least one dispensing unit.

4. The pressure profiling device according to claim 1, further comprising:
   a flow sensor placed on said bypass duct, said flow sensor being adapted to generate a signal indicative of the flow rate of said first part of said liquid flowing in said bypass duct, and
   an electronic control unit programmed to vary the degree of opening of said proportional valve on the basis of said signal indicative of the flow rate of said first part of said liquid flowing in said bypass duct.

5. The pressure profiling device according to claim 1, further comprising:
   a pressure sensor placed on said delivery duct downstream of said three-way hydraulic fitting and adapted to generate a signal indicative of the pressure of said remaining second part of said liquid flowing towards said dispensing unit, and
   an electronic control unit programmed to vary the degree of opening of said proportional valve on the basis of said signal indicative of the pressure of said remaining second part of said liquid flowing towards said dispensing unit.

6. The pressure profiling device according to claim 1, further comprising:
   a flow sensor placed on said delivery duct downstream of said three-way hydraulic fitting and adapted to generate a signal indicative of the flow rate of said remaining second part of said liquid flowing towards said dispensing unit, and
   an electronic control unit programmed to vary the degree of opening of said proportional valve on the basis of said signal indicative of the flow rate of said remaining second part of said liquid flowing towards said dispensing unit.

7. The pressure profiling device according to claim 4, wherein the flow sensor is integral to said proportional valve.

8. The pressure profiling device according to claim 4, wherein said proportional valve comprises a shutter movable between a closed position and a maximum opening position, and a position sensor adapted to generate a signal indicative of the position of said shutter between said closed position and said maximum opening position, said electronic control unit being programmed to vary the position of said shutter on the basis of said signal indicative of the position of said shutter between said closed position and said maximum opening position.

9. An espresso coffee machine comprising at least an espresso coffee dispensing unit and the pressure profiling device according to claim 1, wherein said delivery duct is connected to said at least one dispensing unit.

10. The espresso coffee machine according to claim 9, wherein said at least an expresso dispensing unit is a plurality of expresso dispensing units and said delivery duct is a plurality of delivery ducts, each of the delivery ducts being connected to a corresponding one of the plurality of expresso dispensing units.

* * * * *